United States Patent [19]

Klueting et al.

[11] 4,366,984

[45] Jan. 4, 1983

[54] SEAT BACK INERTIA LATCH SYSTEM

[75] Inventors: Bernd A. Klueting, Radevormwald, Fed. Rep. of Germany; Vikram Zaveri, Springfield, Mich.

[73] Assignee: Keiper U.S.A., Inc., Battle Creek, Mich.

[21] Appl. No.: 163,223

[22] Filed: Jun. 26, 1980

Related U.S. Application Data

[63] Continuation-in-part of Ser. No. 90,343, Nov. 1, 1979, Pat. No. 4,295,682.

[51] Int. Cl.³ .............................................. B60N 1/02
[52] U.S. Cl. ..................................... 297/379; 297/216
[58] Field of Search ............... 297/379, 378, 216, 366, 297/367, 354, 355

[56] References Cited

U.S. PATENT DOCUMENTS

| 3,455,602 | 7/1969 | Cruz et al. | 297/354 |
| 4,118,067 | 10/1978 | Tanaka | 297/379 |
| 4,165,128 | 8/1979 | Strowick et al. | 297/379 X |
| 4,225,177 | 9/1980 | Kluting | 297/379 X |

Primary Examiner—William E. Lyddane

[57] ABSTRACT

An inertia latch return linkage for a seat back inertia latch system normally biasing the inertia latch to an engagement oriented position maintained by inertia effect upon sudden vehicle deceleration, such linkage being rendered inoperative to permit gravity disengagement of the inertia latch upon initial seat back tilting in a forward direction when the vehicle is stationary.

11 Claims, 6 Drawing Figures

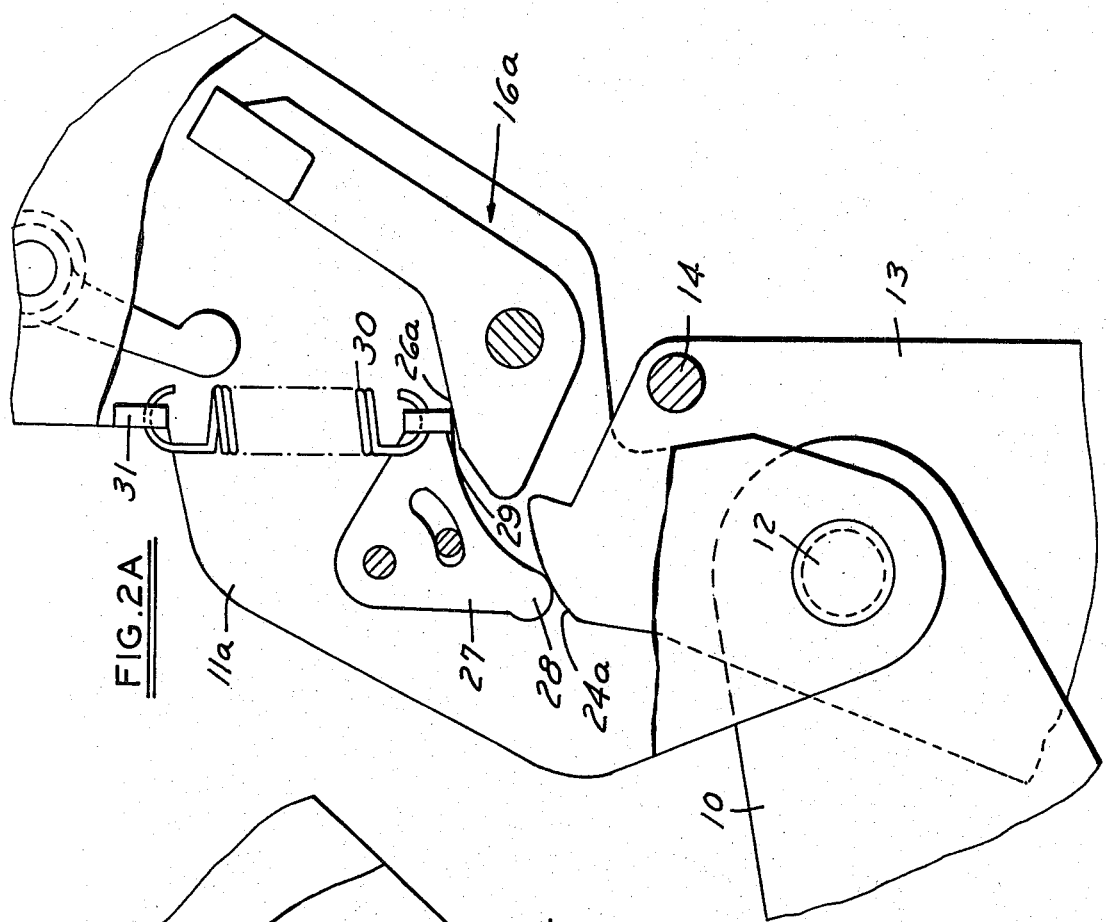
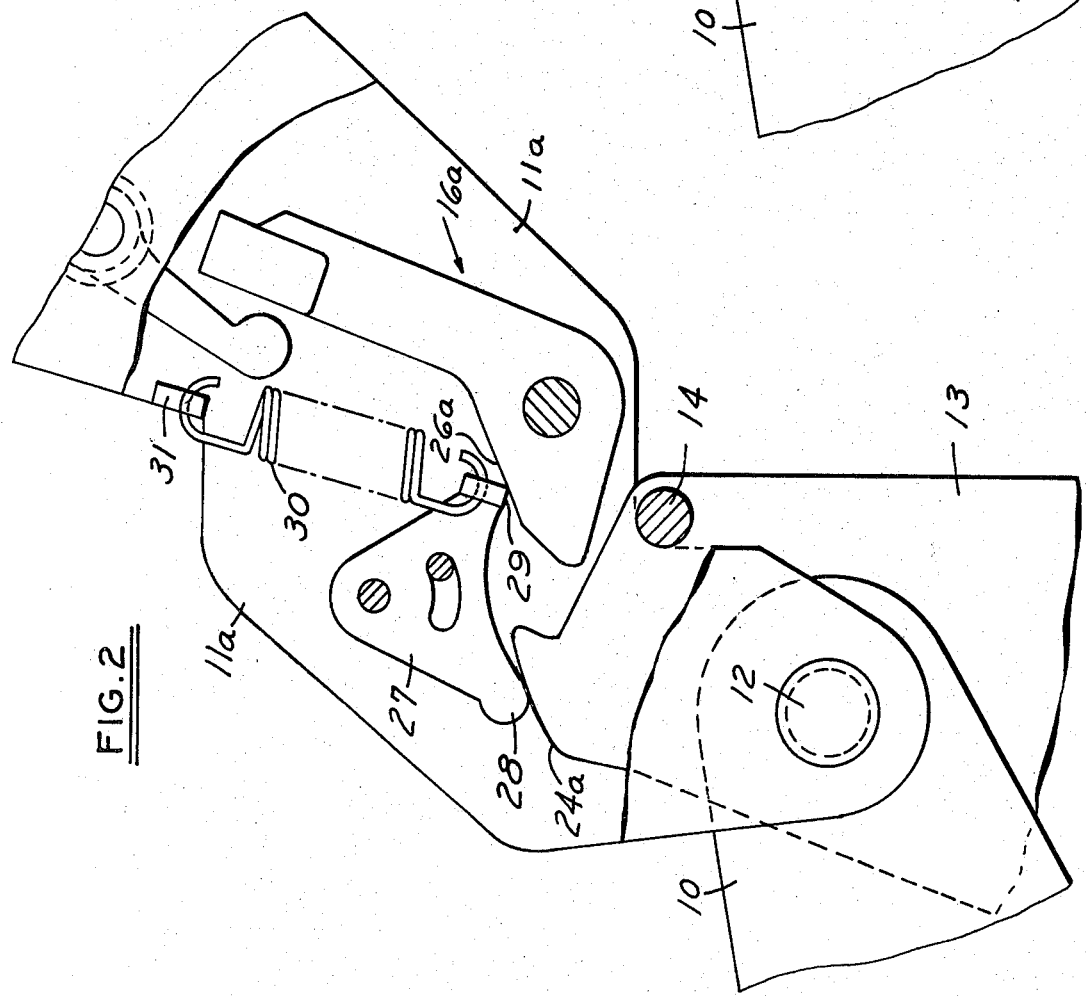

SEAT BACK INERTIA LATCH SYSTEM

REFERENCE TO PRIOR APPLICATION

This application is a continuation in part of our co-pending U.S. application Ser. No. 06/090,343 filed on Nov. 1, 1979 for U.S. Pat. No. 4,295,682 for Seat Back Adjuster.

BACKGROUND OF THE INVENTION

Seat back inertia latch systems such as disclosed in our prior U.S. pat. applications Ser. No. 945,303 filed Sept. 25, 1978 now U.S. Pat. No. 4,223,946, Ser. No. 06/047,362 filed June 11, 1979 now and U.S. Pat. Ser. No. 06/090,343 filed Nov. 1, 1979 employ inertia elements having backward extensions positioning the inertia element in an engagement oriented relationship with the latch element when the seat back is in normal position which overcomes the gravity biasing of such inertia element toward a release position. Disengagement of each such extension with a stationary element of the seat is progressively effected by initial seat back tilting in a forward direction to permit gravity release of the inertia element from its latching orientation. Such backward extension of the inertia element per se together with the cooperating stationary back stop project to some extent into the available space fo the rear passenger. Such extension and back stop also involve some weight and material costs which potentially can be saved if eliminated. In addition tolerance requirements inherently involve some clearance between the inertia and latching element, together with some inertia element movement upon sudden deceleration, in order to reach full latch engagement orientation which to some extent inhibits latching efficiency.

SUMMARY OF THE PRESENT INVENTION

In order to reduce encroachment into the space for rear passengers by the inertia latch system, reduce weight and cost, and normally bias the inertia latch into full latch engaging orientation, the present invention eliminates the backward extension of the inertia element and cooperating stationary back stop and provides a supplemental element for biasing the inertia element into full latch engagement orientation when the seat is fully back which supplemental element is released upon initial forward tilting of the seat back. Such element may be located forwardly of the inertia element pivot and constructed with less weight and at reduced costs relative to the prior constructions.

In our prior co-pending U.S. application Ser. No. 06/090,343 one embodiment of the present invention was shown and described in and with reference to FIG. 11, corresponding to FIG. 1 of the present disclosure. Additional embodiments are also disclosed herein.

BRIEF DESCRIPTION OF THE DRAWINGS

FIG. 2 is a view similar to FIG. 1 showing a modified embodiment of the present inertia latch system;

FIG. 2a is a view similar to FIG. 1a of the modified embodiment;

DETAILED DESCRIPTION OF THE PREFERRED EMBODIMENT

Figure 1A:
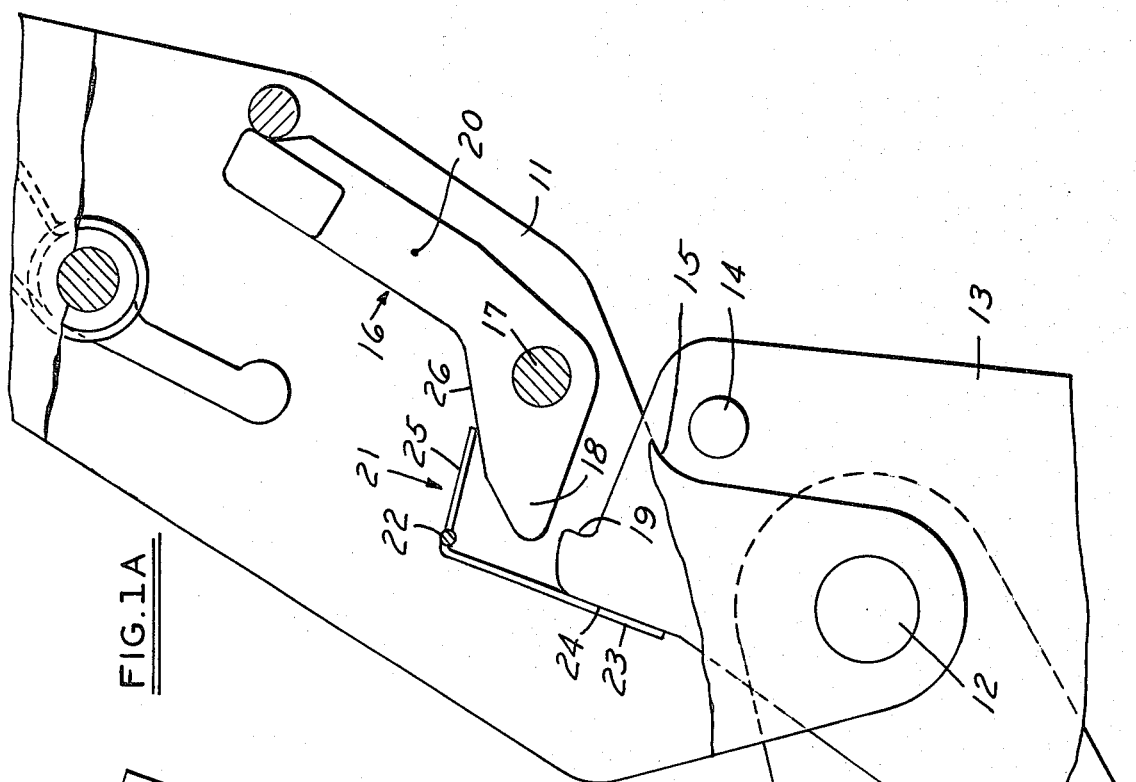
FIG. 1a is a similar view showing the relationship of the inertia latch system components upon initial forward tilting of the seat.
Figure 1:
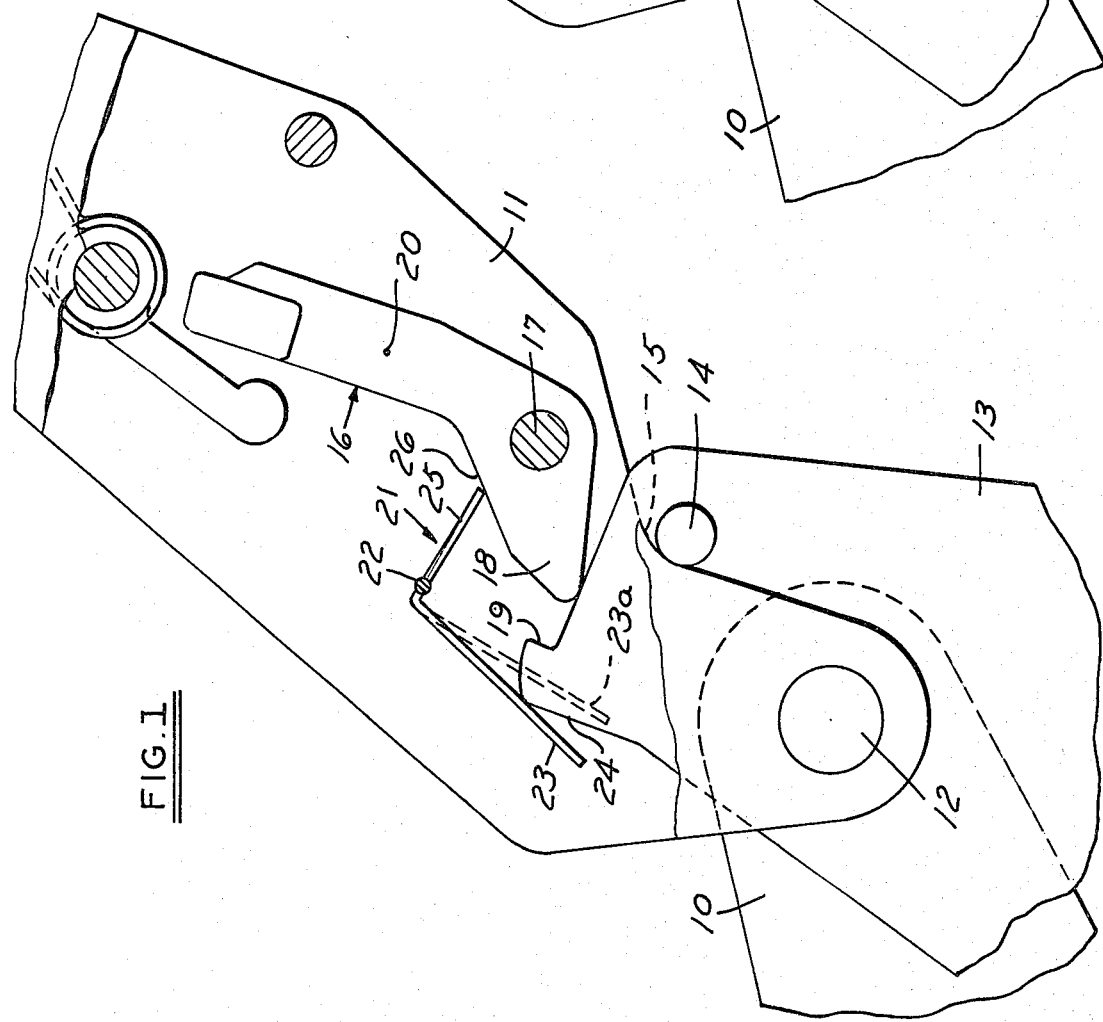
FIG. 1 is a fragmentary side elevation of a preferred embodiment of a seat hinge provided with an inertia latch system of the present invention shown with the seat back in normal position.

With reference to FIGS. 1 and 1a the hinge fitting comprises a first hinge member 10 connectable to the seat of an automotive vehicle by suitable fasteners, not shown, and a second main hinge member 11 connectable to the back rest of the vehicle seat by suitable fasteners, not shown. Pivotal connection 12 is provided between the first and second hinge members. Optionally the seat hinge may be provided with an intermediate adjustment member 13 for changing the angle of the seat back to a reclining or other position by adjustment mechanism known in the art in which case stop 14 on such intermediate member will establish the limited backward travel of hinge member 11 for the operative position of the seat back through registration with engaging surface 15 of hinge member 11. Inertia latch element 16 pivotally connected at 17 to hinge member 11 is provided with latch nose 18 for engaging abutment 19 on an integral extension of adjustment member 13 in order to arrest forward travel of the seat back under a condition of sudden deceleration of the vehicle whereupon inertia operating on center of gravity 20 maintains the inertia latch in its operative orientation as shown in FIG. 1 for effective latch engagement.

Such orientation is established and normally maintained, when the seat back is moved to its operative position, by leaf spring 21 pivotally mounted at 22 to hinge member 11 having extension 23 engaging shoulder 24 of adjustment member 13 deflecting extension 23 from its free position 23a thereby biasing spring extension 25 against forward surface 26 of the inertia element to induce counterclockwise pivoting of such element to its operative orientation and overcoming the gravity force operating at the center of gravity 20 urging the inertia element to pivot in a clockwise direction. With reference to FIG. 1a, upon initial forward tilting of the seat back when the vehicle is stationary relaxation of spring tension in extension 23 permits gravity to actuate the inertia element 16 to the release position shown.

With reference to FIGS. 2 and 2a a similar result is accomplished with plastic bellcrank element 27 pivotally mounted on hinge member 11a having leg extension 28 for engaging shoulder 24a and leg extension 29 for engaging forward surface 26a of inertia element 16a when the seat back is moved to the rest position shown in FIG. 2. Tension spring 30 anchored to hinge member 11a at 31 moves bellcrank 27 in a counterclockwise releasing direction upon initial forward seat back tilting when the vehicle is stationary as shown in FIG. 2a.

Figure 3:
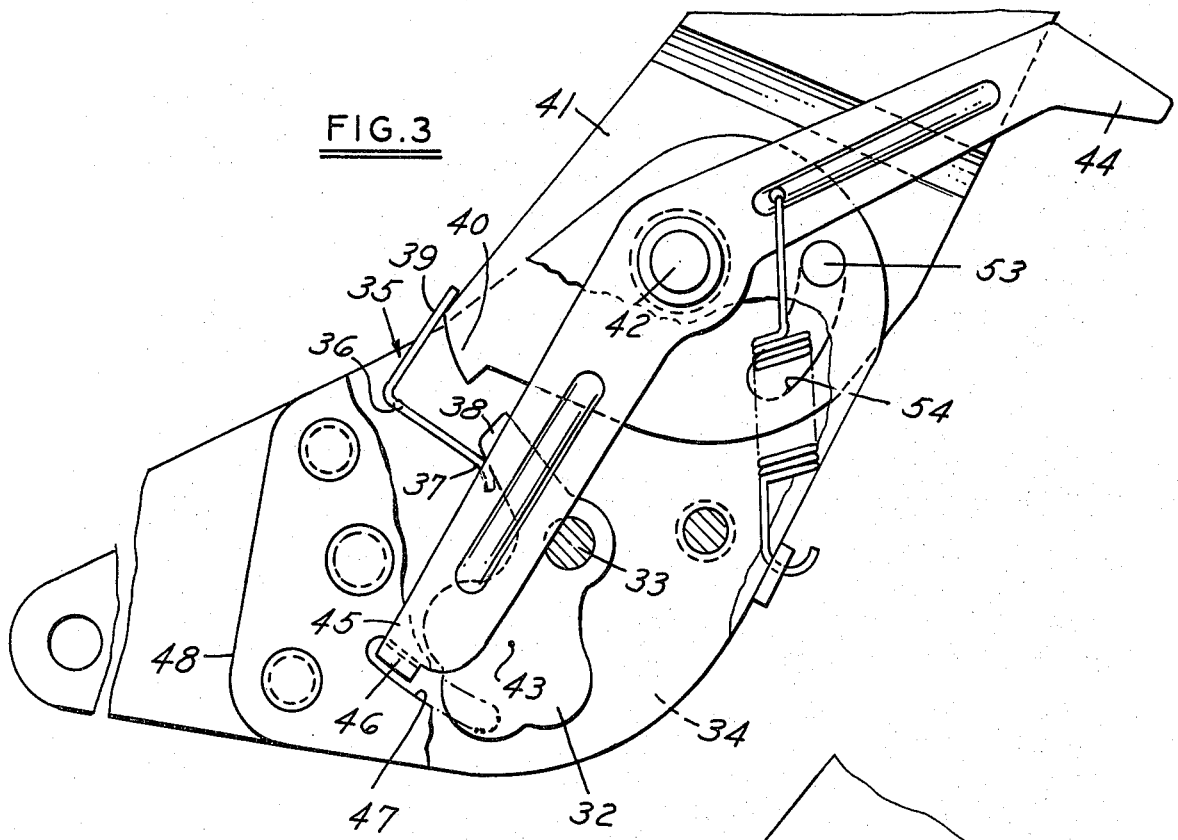
FIG. 3 is a view similar to FIG. 1 showing a second modified embodiment.

With reference to FIG. 3 showing the adaptation of the present link to a pendulum type suspended inertia element 32 pivoted at 33 to lower seat bracket 34, leaf spring 35, similar to spring 21 of FIGS. 1, 1a, is pivotally mounted at 36 to lower seat bracket 34 and is provided with extension 37 for engaging the forward outside surface of latch projection 38 of inertia element 32 and with extension 39 for engaging the outside forward surface of latch abutment 40 projecting from upper seat back hinge member 41 pivotally connected at 42 to lower seat back member 34. Here again upon initial forward tilting of the seat back center of gravity at 43 of pendulum inertia element 32 produces counterclockwise movement of the inertia element to a release position permitted by movement of abutment 40 permitting clockwise pivoting of leaf spring 35.

Manual override lever 44, also pivoted at 42, has arm 45 with projection 46 extending through slot 47 and bracket cover 48 which permits manual release of inertia latch element 32 in the event of malfunction.

Figure 4:
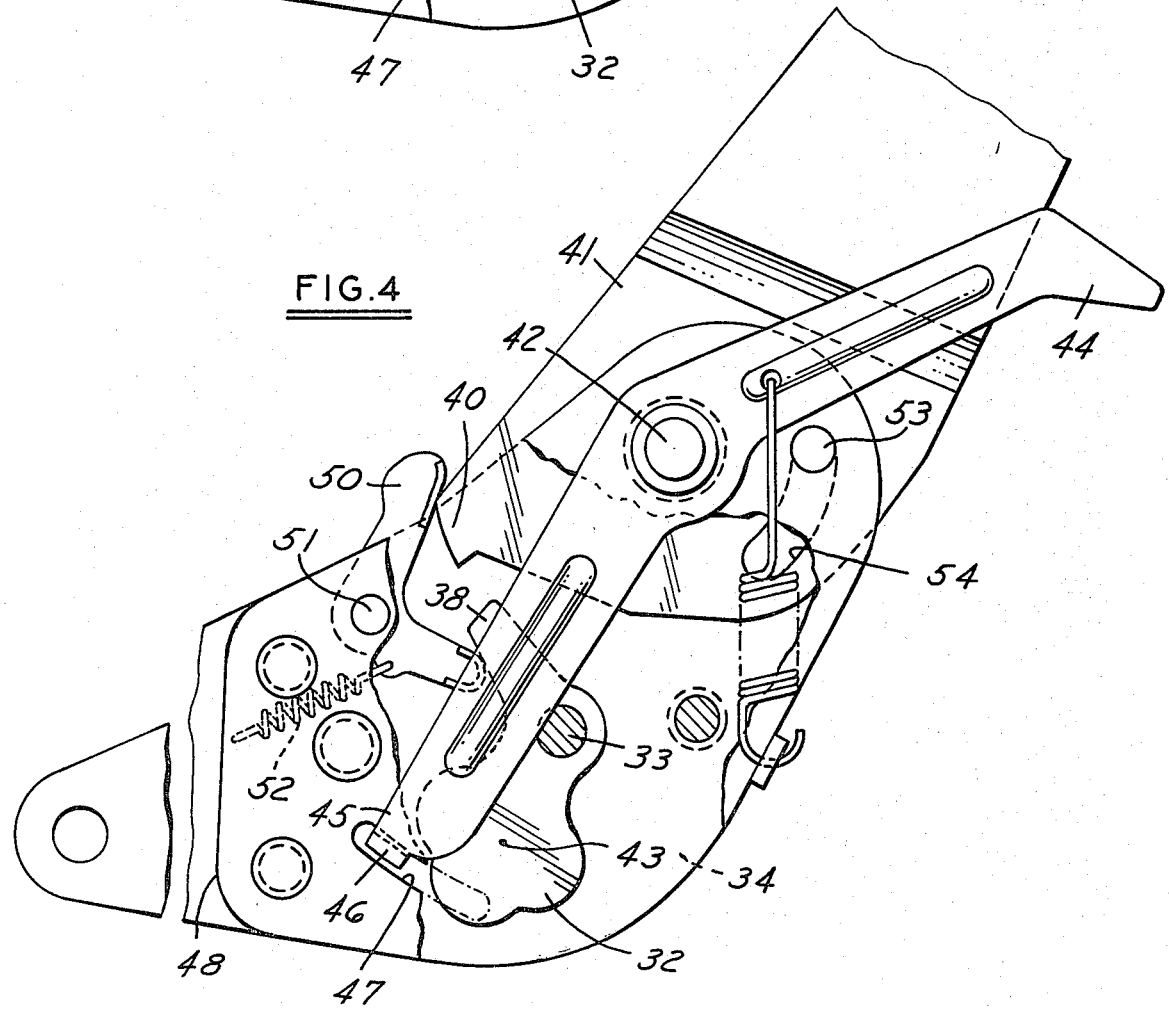
FIG. 4 is a view similar to FIG. 1 showing a third modified embodiment.

With reference to FIG. 4 plastic bellcrank 50, similar to bellcrank 27 of FIGS. 2 and 2a, pivotally connected at 51 to the lower seat hinge assembly serves the function of FIG. 3 being retracted by tension spring 52 to an inertia latch release position upon initial forward tilting of the seat back.

In each of the embodiments of FIGS. 3 and 4 the rest position of the seat back is established by engagement of limit stop pin 53 anchored to the lower seat hinge assembly with one end of arcuate slot 54, centered on the hinge pivot 42, provided in seat back hinge member 41.

From the foregoing description of several embodiments it will be understood that other return linkage provisions may be made for either pendulum or above pivot center inertia elements which are within the scope of the invention as defined in the appended claims.

We claim:

1. A hinge fitting for a vehicle seat having a forward tiltable backrest comprising a first hinge member attachable to a lower seat member, a second hinge member attachable to a backrest seat member and pivotally connected to said first hinge member, an abutment stop for establishing the occupant's seated position of said second hinge member, an inertia latch system including means for arresting forward pivotal movement of said second hinge member under conditions of sudden vehicle deceleration and including automatic means for permitting manual forward tilting of said seat back under a stationary vehicle condition, said system being characterized by a pivoted latch inertia element having an installed center of gravity horizontally displaced from the pivotal center to provide a pivotal moment in one direction toward a latch release orientation and vertically displaced from the pivotal center to provide an inertial pivotal moment in the opposite direction toward latch engagement orientation when the vehicle is subject to sudden deceleration, and inertia latch return linkage means mounted separately from said inertia element responsive to movement of said second hinge member to said stop position to overcome said gravity moment and bias said inertia element in said opposite direction toward an operative latching orientation, including linkage deactivating means responsive to initial forward seat back tilting permitting said gravity moment to move said inertia element to a latch release orientation when said vehicle is stationary.

2. A hinge fitting as set forth in claim 1 wherein said inertia latch return linkage means comprises an element pivotably mounted forwardly of said inertia element's pivotal center which biases said inertia element towards an operative latching orientation in response to said second hinge member's movement to said stop position.

3. A hinge fitting as set forth in claim 2 wherein said pivoted linkage element includes an actuated extension responsive to the relative position of said second hinge member to said stop.

4. A hinge fitting as set forth in claim 3 wherein said pivoted linkage element includes an actuating extension engaging said pivoted latch inertia element.

5. A hinge fitting as set forth in claim 4 wherein said pivoted linkage element comprises a leaf spring deflected from its free position by the movement of said second hinge member to said stop position.

6. A hinge fitting as set forth in claim 1 wherein said inertia latch return linkage means includes a pivot lever, resilient means biasing said lever in an inertia latch release direction, and means responsive to movement of said second hinge member to said stop position for actuating said lever to move said pivoted latch inertia element toward latch engagement orientation.

7. A hinge fitting as set forth in any of claims 1 to 6 wherein the center of gravity of said pivoted latch inertia element is above its pivotal mounting.

8. A hinge fitting as set forth in any of claims 1 to 6 wherein the center of gravity of said pivoted latch inertia element is below its pivot center.

9. A hinge fitting as set forth in any of claims 1 to 6 wherein said inertia latch return linkage engages said pivoted latch inertia element forwardly of the inertia element's pivotal center.

10. A hinge fitting as set forth in any of claims 1 to 6 wherein a third adjustable hinge member is provided to interengage with said first and second hinge members to establish an adjustable occupant seated position of said second hinge member, and wherein said abutment stop is located on said third hinge member.

11. A hinge fitting as set forth in any of claims 1 to 6 wherein said pivoted latch inertia element is pivotally mounted on said second hinge member so that the inertia effect of rapid forward tilting of said seat back when said vehicle is stationary assists gravity in moving said pivoted latch inertia element toward a latch release orientation.

* * * * *